(12) United States Patent
Chang et al.

(10) Patent No.: US 9,891,310 B2
(45) Date of Patent: Feb. 13, 2018

(54) SEQUENTIAL MULTI-BEAM RADAR FOR MAXIMUM LIKELIHOOD TRACKING AND FENCE SEARCH

(71) Applicant: Raytheon Company, Waltham, MA (US)

(72) Inventors: Kaichiang Chang, Northborough, MA (US); Yong Liu, Acton, MA (US); David R. Schmidt, Stow, MA (US); Stephen M. Sparagna, Milton, MA (US); Frederic C. Stevens, IV, Milford, MA (US)

(73) Assignee: Raytheon Company, Waltham, MA (US)

( * ) Notice: Subject to any disclaimer, the term of this patent is extended or adjusted under 35 U.S.C. 154(b) by 218 days.

(21) Appl. No.: 14/677,580

(22) Filed: Apr. 2, 2015

(65) Prior Publication Data
US 2016/0291144 A1    Oct. 6, 2016

(51) Int. Cl.
| | |
|---|---|
| *G01S 13/72* | (2006.01) |
| *G01S 13/44* | (2006.01) |
| *H01Q 25/02* | (2006.01) |
| *H01Q 21/06* | (2006.01) |
| *G01S 7/03* | (2006.01) |
| *G01S 13/02* | (2006.01) |

(52) U.S. Cl.
CPC ............. *G01S 13/72* (2013.01); *G01S 7/03* (2013.01); *G01S 13/4463* (2013.01); *H01Q 21/061* (2013.01); *H01Q 25/02* (2013.01); *G01S 2013/0254* (2013.01)

(58) Field of Classification Search
CPC .............................. G01S 13/72; G01S 13/4463

USPC ............................................................ 342/146
See application file for complete search history.

(56) References Cited

U.S. PATENT DOCUMENTS

| | | | |
|---|---|---|---|
| 5,128,683 A * | 7/1992 | Freedman | G01S 7/032 342/158 |
| 7,576,682 B1 | 8/2009 | Yu | |
| 7,671,789 B1 * | 3/2010 | Yu | G01S 13/4463 342/152 |
| 7,969,345 B2 | 6/2011 | Abatzoglou et al. | |

(Continued)

FOREIGN PATENT DOCUMENTS

| | | |
|---|---|---|
| EP | 1 742 081 A2 | 1/2007 |
| EP | 1 742 081 A3 | 7/2008 |

OTHER PUBLICATIONS

Richard M. Davis, Ronald L. Fante, A Maximum-Likelihood Beamspace Processor for Improved Search and Track, Jul. 7, 2001, IEEE, vol. 49, No. 7, pp. 1043-1053 (11 pages).

(Continued)

*Primary Examiner* — Tashiana R Adams
*Assistant Examiner* — Helena H Seraydaryan
(74) *Attorney, Agent, or Firm* — Daly, Crowley, Mofford & Durkee, LLP

(57) ABSTRACT

A radar system uses multiple-beam maximum likelihood estimation (MLE) during both search and tracking operations. During search, a four beam sequential beam cluster may be used to search for targets in a region-of-interest. During tracking, a three beam triad may be used to track one or more detected targets. In some embodiments, a beam selector switch may be used to allow two offset receive beams to time share a beamformer output port to generate the four beam sequential cluster.

19 Claims, 7 Drawing Sheets

(56) References Cited

U.S. PATENT DOCUMENTS 8,451,173 B2 5/2013 Hansen
2007/0001897 A1* 1/2007 Alland .................... G01S 7/288
342/70

OTHER PUBLICATIONS

Notification of Transmittal of the International Search Report and the Written Opinion of the International Searching Authority, or the Declaration, PCT/US2016/024901, dated Nov. 22, 2016, 1 page.
International Search Report, PCT/US2016/024901, dated Nov. 22, 2016, 5 pages.
Written Opinion of the International Searching Authority, PCT/US2016/024901, dated Nov. 22, 2016, 9 pages.

* cited by examiner

SEQUENTIAL MULTI-BEAM RADAR FOR MAXIMUM LIKELIHOOD TRACKING AND FENCE SEARCH

BACKGROUND

Radar systems are systems that use radio frequency (RF) waves to derive information about targets, if any, in a region of interest. An RF pulse may be transmitted into the region of interest and, if a target exists in the path of the pulse, reflected energy will be returned to the radar. The radar may then analyze the reflected signal (and possibly other reflected signals) to determine information about the target. Radar systems are used in a wide variety of different applications involving a variety of different target types. For example, as air traffic control radar may detect and track aircraft about an airport to support air traffic controllers. Likewise, a weather radar may be used to detect and track potentially harmful weather formations in a region of interest. An early warning radar (EWR) may be used to, for example, detect and track incoming enemy missiles and/or aircraft as early as possible to allow counter measures to be deployed before arrival thereof.

Depending on application, it may be very important to achieve accurate and reliable results in a radar system. For example, a missed detection or inaccurate target position/velocity in an EWR can have devastating results. Therefore, radar systems are often required to meet tight operational specifications to ensure reliability and accuracy. If a particular radar system does not meet, the specifications, changes may be required to the system design to bring it within specification.

SUMMARY

The present disclosure relates to a radar system that uses a multiple-beam maximum likelihood estimation (MLE) algorithm for both search and tracking operations. The use of an MLE algorithm in this manner allows low side lobe levels (SLL) to be maintained for the radar by reducing quantization errors that might increase subarray quantization lobes. As a result, such radars are more likely to meet system sidelobe requirements than comparable systems (e.g., systems that use monopulse during tracking and/or search). In some embodiments, features disclosed herein may be used to retrofit existing systems to use MLE during both search and tracking. For example, disclosed features may be used to upgrade a monopulse based radar in some implementations to utilize MLE to improve sidelobe level (SLL) performance in the system. In this manner, much of the hardware and software of the existing system may still be used, resulting in significant cost savings.

In accordance with one aspect of the concepts, systems, circuits, and techniques described herein, a radar system comprises: an array antenna having a plurality of subarrays; a beamformer to generate first, second, third, and fourth overlapping offset receive beams that are arranged as two triads for the array antenna, the beamformer comprising: first, second, and third beam output ports, wherein the first overlapping receive beam is coupled to the first beam output port and the third overlapping receive beam is coupled to the second beam output port; and a switch to allow the second and fourth overlapping receive beams to time share the third, beam output port.

In one embodiment, the radar system farther comprises a maximum likelihood estimator coupled to acquire receive signal information associated with the first, second, and third beam output ports, the maximum likelihood estimator to estimate a location of a target, if any, based on the receive signal information, wherein the maximum likelihood estimator is used to determine target location during both search and track operations.

In one embodiment, the radar system further comprises a controller to control operation of the radar system, wherein the controller is configured to generate a sequential four beam receive cluster via time multiplexed beams to form a search fence to perform maximum likelihood searching for the radar system.

In one embodiment, the controller is configured to generate a three receive beam triad to perform maximum likelihood tracking for a detected target, wherein the three beam triad includes three of the overlapping offset receive beams generated by the beamformer.

In one embodiment, the controller is configured to generate a transmit beam directed toward a centroid of the sequential four beam receive cluster during maximum likelihood searching.

In one embodiment, the controller is configured to generate a transmit beam directed toward the target being tracked during maximum likelihood tracking.

In one embodiment, the array antenna is divided into four quadrants and the plurality of subarrays are divided symmetrically among the four quadrants; and the beamformer includes: (i) a first stage having a plurality of subarray beamformers to form beams for subarray groups of the array antenna, each subarray group including one subarray from each of the four quadrants of the array antenna; and (ii) a second stage to combine outputs of the subarray beamformers to form the first, second, third, and fourth overlapping offset receive beams, wherein the first, second, and third beam output ports and the switch are part of the second stage.

In one embodiment, the plurality of subarray beamformers include fixed offset delay cables to generate the offsets between the first, second, third, and fourth overlapping offset receive beams.

In one embodiment, the beamformer is a retrofit added to the radar system to improve the system's ability to meet one or more performance requirements.

In accordance with another aspect of the concepts, systems, circuits, and techniques described herein, a method for use in a radar system having an AESA antenna comprises: forming four overlapping offset receive beams arranged in two triads for the AESA antenna; performing four beam maximum likelihood estimation (MLE) searching using the four overlapping offset receive beams in a four beam sequential cluster to search for targets; and performing three beam MLE tracking to track a target detected during four beam MLE searching using three of the four overlapping offset receive beams.

In one embodiment, the four beam sequential cluster is generated by time multiplexing beams at one or more beamformer output ports.

In one embodiment, performing four beam MLE searching includes generating a search fence by repeating the four beam sequential cluster.

In one embodiment, performing four beam MLE searching includes transmitting a signal toward a centroid of the four beam sequential cluster.

In accordance with a further aspect of the concepts, systems, circuits, and techniques described herein, a radar system comprises: an AESA antenna; a beamformer to generate multiple overlapping offset receive beams for the AESA antenna; and a controller to provide control functions for the radar system, wherein the controller is configured to perform multi-beam maximum likelihood (ML) searching for the radar system to search for targets in a coverage region of interest and to perform multi-beam ML tracking for the radar system to track one or more detected targets in the coverage region; wherein the controller is configured to generate a sequential four beam receive cluster via time multiplexed beams to form a search fence to perform, the multi-beam ML searching for the radar system.

In one embodiment, the controller is configured to generate a transmit beam directed toward a centroid of the sequential four beam receive cluster daring ML searching.

In one embodiment, the controller is configured to generate a three receive beam triad to perform multi-beam ML tracking for the radar system.

BRIEF DESCRIPTION OF THE DRAWINGS

The foregoing features may be more fully understood from the following description of the drawings in which.

DETAILED DESCRIPTION

Techniques and systems described in the present disclosure relate to an Active Electronically Scanned Array (AESA) radar system that uses a multi-beam maximum likelihood algorithm during both search and tracking operations. In some implementations, the techniques described herein may be used to upgrade or retrofit radar systems already in existence. However, some of the features and techniques described herein also have application in newly designed systems. In the discussion that follows, various features will be described in the context of an early warning radar (EWR). It should be appreciated, however, that the features of the present disclosure also have application in other types of radar systems.

Figure 1:
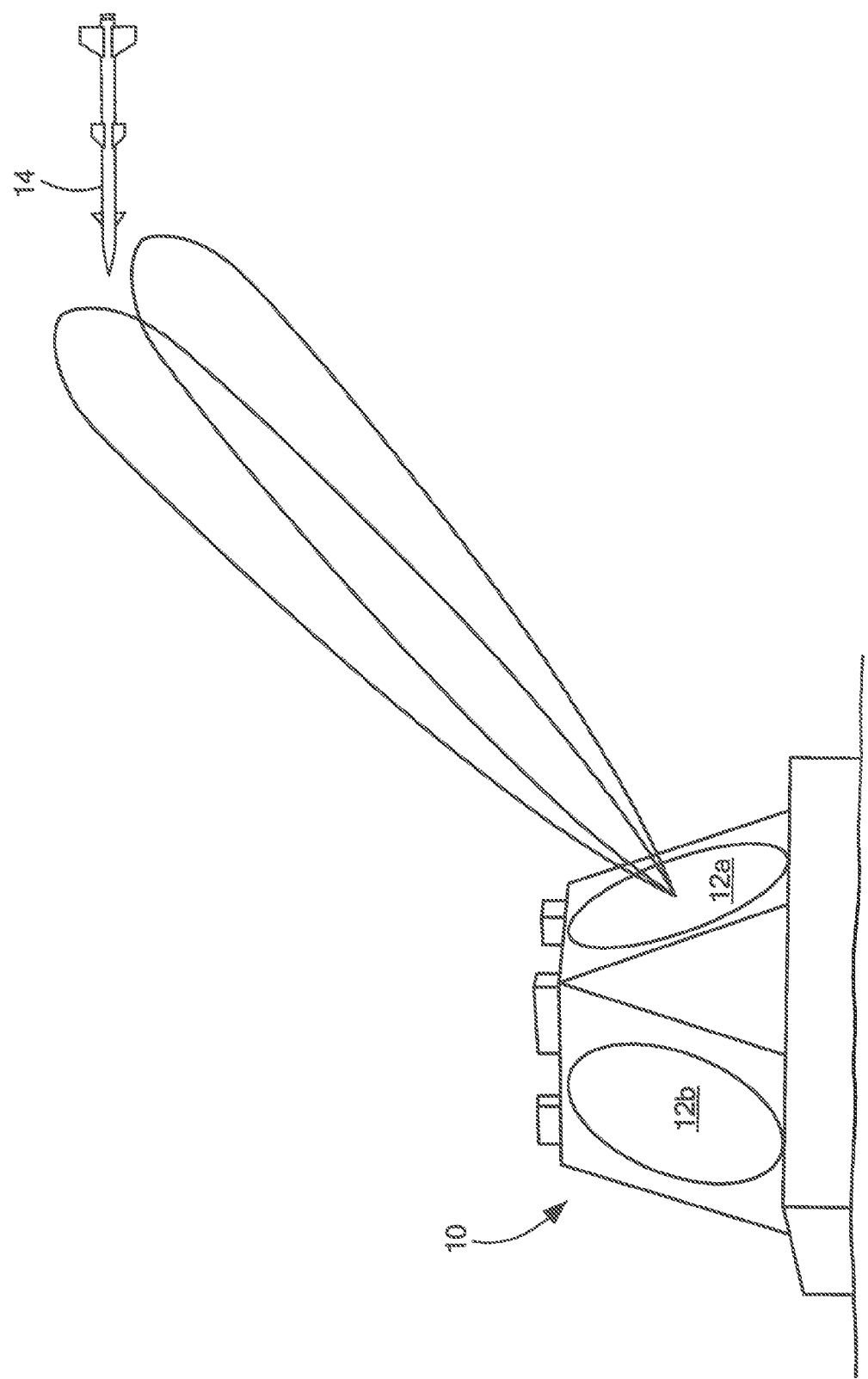
FIG. 1 is a diagram illustrating operation of an early warning radar (EWR) that may incorporate features of the present disclosure.

FIG. 1 is a diagram illustrating operation of an exemplary EWR system 10 that may incorporate features of the present disclosure. As shown, the EWR 10 may include a building or other structure that includes one or more AESA antennas 12a, 12b on external faces thereof. In some implementations, the EWR 10 may include one AESA radar on each of three faces that are each directed at 120 degree angles from one another to achieve 360 degree radar coverage in azimuth. A primary purpose of the early warning radar 10 may be to detect the approach of enemy missiles and/or aircraft 14 as early as possible so that countermeasures may be taken to deflect or stop an attack. After detection of a target, the EWR 10 may be used to track the location of the target. The EWR 10 may be capable of tracking multiple targets simultaneously. As will be appreciated, it is important that the EWR 10 operate reliably and accurately as a missed, delayed, or inaccurate detection can have very harmful results. To ensure reliable and accurate operation, detailed operational specifications typically exist for such radar systems. In this manner, the radar may be tested to determine whether it is operating as designed or whether tuning or other corrective measures need to be made to bring the radar system within specifications.

One important operational parameter for a radar system that uses AESA antennas is sidelobe level (SLL). In radars and other systems that use AESAs, a desired function is typically carried out using the main beam of the antenna formed as a simple summation of all of the antenna elements. At the same time, the antenna elements can be electronically manipulated to detect target directional data. Both summation and simultaneous directional data can be used together to accurately track a target of interest. However, for various reasons, other undesired beams, or sidelobes, may be generated by the array antenna which can cause problems for the overall system tracking performance. As such, it is usually desired that the magnitude of the sidelobes be kept below a certain level (i.e., kept below a certain ratio with respect to the main beam gain). The prior art (i.e., monopulse sum and difference beams) exhibited high SLLs that required circumvention in order to meet detection and tracking performance requirements.

Large scale radar systems can be very expensive to design and build. Sometimes, rather than design a whole new system, changes may be made to an existing design to achieve a new system. The changes, however, can lead to an inability to meet one or more system requirements. For example, a new radar system may be required that has specific target detection requirements. It may be decided that the new radar system can be achieved by modifying an existing design that has higher target detection requirements. Because the new design has lower target detection requirements, it may be determined that a smaller array can be used than was used in the prior design to reduce cost. The smaller array, however, may have a harder time meeting sidelobe requirements. In such a case, additional changes to the new design may be needed so that all system requirements can be satisfied.

In some aspects of the present disclosure, techniques are provided for modifying an existing radar system to achieve enhanced side lobe level performance without requiring major changes to underlying system hardware. It should be appreciated, however, that various features and benefits described herein are also applicable to new system designs and are not limited to use in modifying previous designs.

Figure 2:
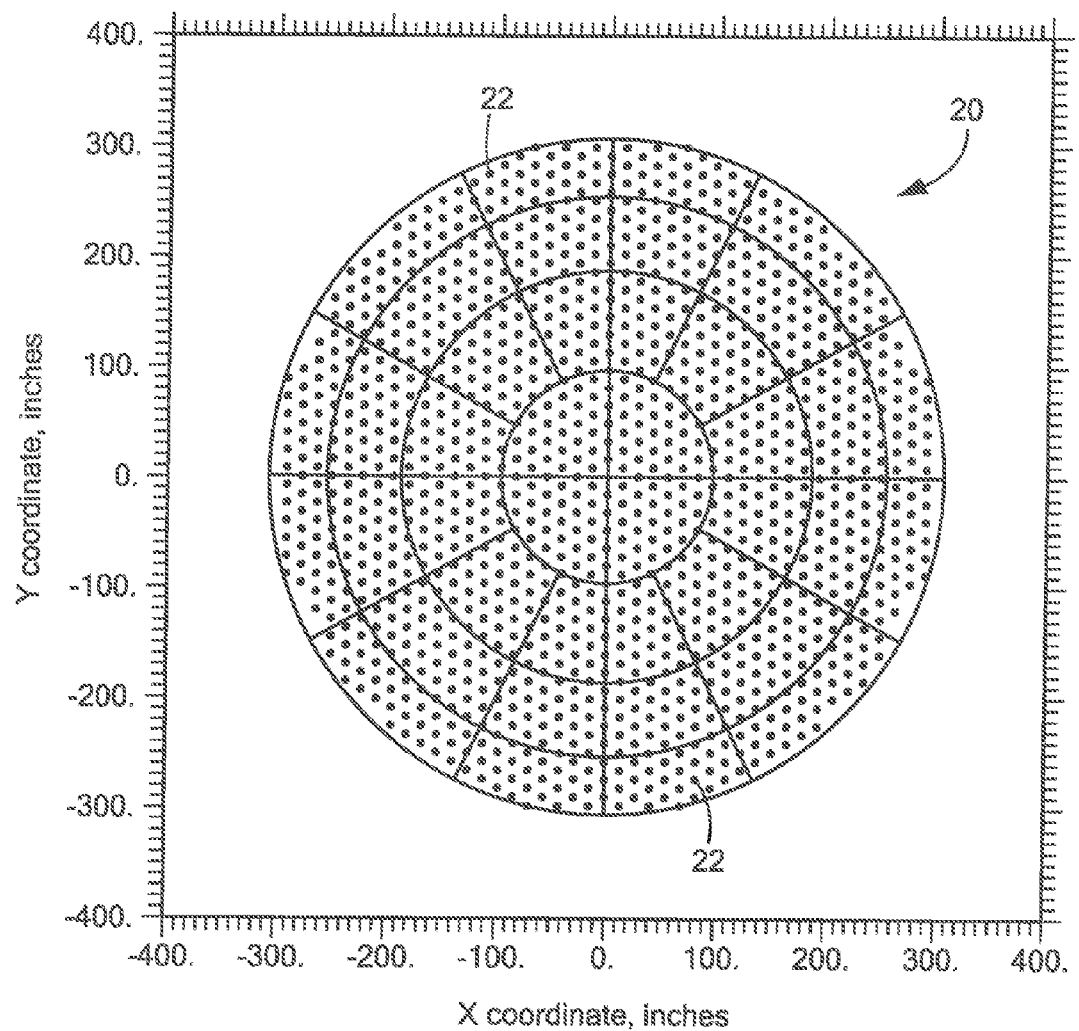
FIG. 2 is a front view of an exemplary AESA antenna that may be used in a radar system in accordance with an embodiment.

FIG. 2 is a front view of an exemplary AESA antenna 20 that may be used in a radar system in accordance with an embodiment. In the illustrated arrangement, the AESA antenna 20 includes 1280 radiating elements (represented by dots) arranged in a circular pattern. In addition, the radiating elements are separated into 40 receive subarrays 22 that each includes 32 elements. Lines are used in FIG. 2 to roughly show the boundaries of the different subarrays. The AESA antenna 20 of FIG. 2 with the corresponding subarray configuration may represent a modification to another radar system design that has a larger number of elements and/or subarrays. The decision to use fewer subarrays may have been made to, for example, improve the ability of the modified system to achieve a system sensitivity requirement. However, the lower number of subarrays may result in an inability of the new system to meet a system. SLL requirement. For example, the AESA antenna 20 of FIG. 2 may have been designed for use with a monopulse tracking technique that uses sum and difference beams for angle estimation. When used with monopulse, the lower number of subarrays may result in significant amplitude quantization errors. In some aspects of the present disclosure, techniques are provided for modifying a radar system that includes an AESA, such as AESA 20 of FIG. 2, in a manner that improves the overall ability to meet a desired SLL requirement using some or all of the existing hardware and/or software.

In at least one aspect of the present disclosure, a radar system design is provided that uses multi-beam maximum likelihood (ML) techniques during both search and track operations. In some implementations, the radar design may be used to modify a radar system that already exists with minimal changes to existing hardware. The radar design may use four overlapping offset receive beams that are configured as two three beam triads. During search, all four beams are used in a sequential repeating manner to form a search fence. As will be described in greater detail, two of the beams in the four beam cluster may be persistent across the search fence, existing in all successive triads of the fence. The other two beams may be alternately switched in and out during search so that they occur only in every other search triad. When a target is detected, a track mode may be initiated to track the detected target. During track mode, only three of the four beams may be used in some implementations. That is, one of the four overlapping receive beams may be ignored.

Figure 7A:
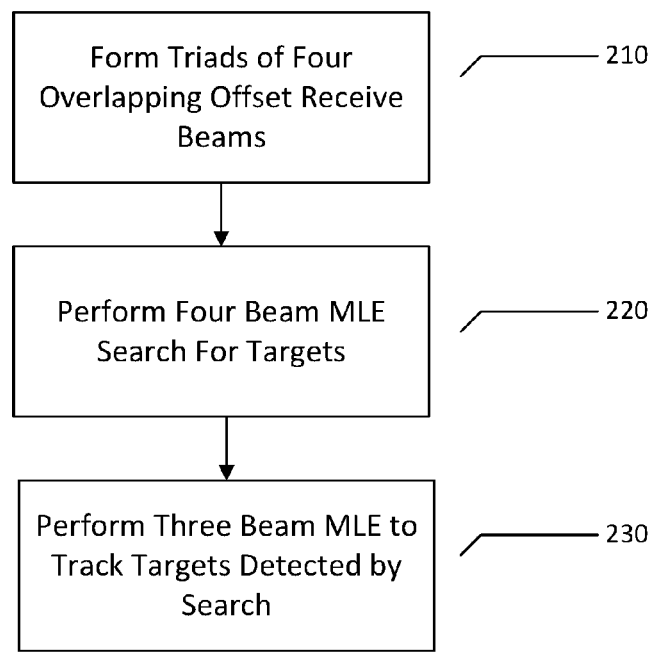
FIG. 7A is a flow diagram of MLE processing in a radar system in accordance with an embodiment.
Figure 7B:
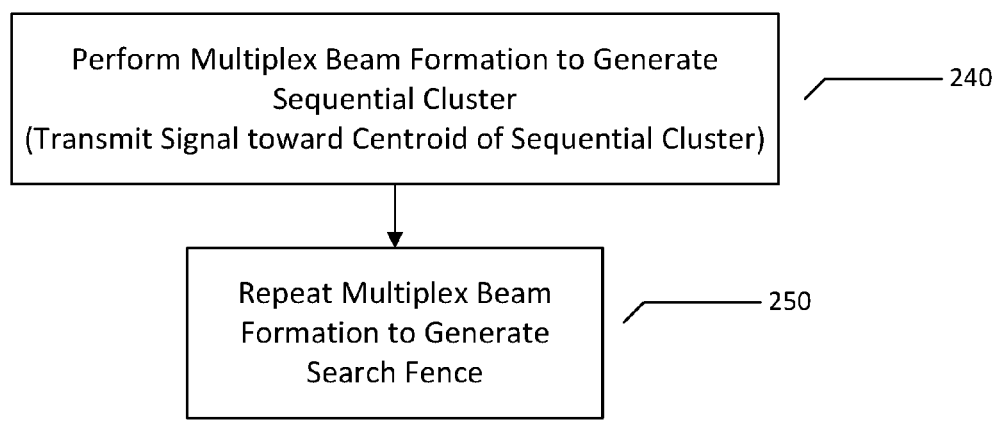
FIG. 7B is a flow diagram of a multiplex beam formation process and generation of a search fence in accordance with an embodiment.

The radar designs of the present disclosure may include a beamformer unit to generate the four overlapping offset receive beams. Although four beams are generated, in some implementations, the beamformer may only include three beam output ports. This limited number of beam output ports may be used, for example, because a previous design being modified only included three processing channels (e.g., three channels to support monopulse operation). Therefore, to support four beam operation, two beams may be allowed to time share one of the three beam output ports. That is, two of the four overlapping receive beams may always be output on corresponding output ports of the beamformer. The other two generated receive beams may time share the third beam output port. In some embodiments, a switch may be provided to controllably couple these two beams to the third beamformer output port. The switch may be a implemented in either hardware or software. FIG. 7B provides an exemplary process flow of steps 240 to perform multiplex beam formation to generate a sequential cluster, transmitting a signal toward the centroid of the sequential cluster, and step 250 of repeating the multiplex beam formation to generate a search fence. The outputs of the beamformer may be coupled after further signal processing to a maximum likelihood estimation (MLE) algorithm to estimate the location (i.e., range and angle) of the target, if any, based on signals received through the corresponding receive beams. This MLE algorithm may be used during both search and track operations. The use of MLE during both search and track in accordance with disclosed techniques and systems can result in low side lobe levels with respect to a corresponding monopulse AESA radar system.

Figure 3:
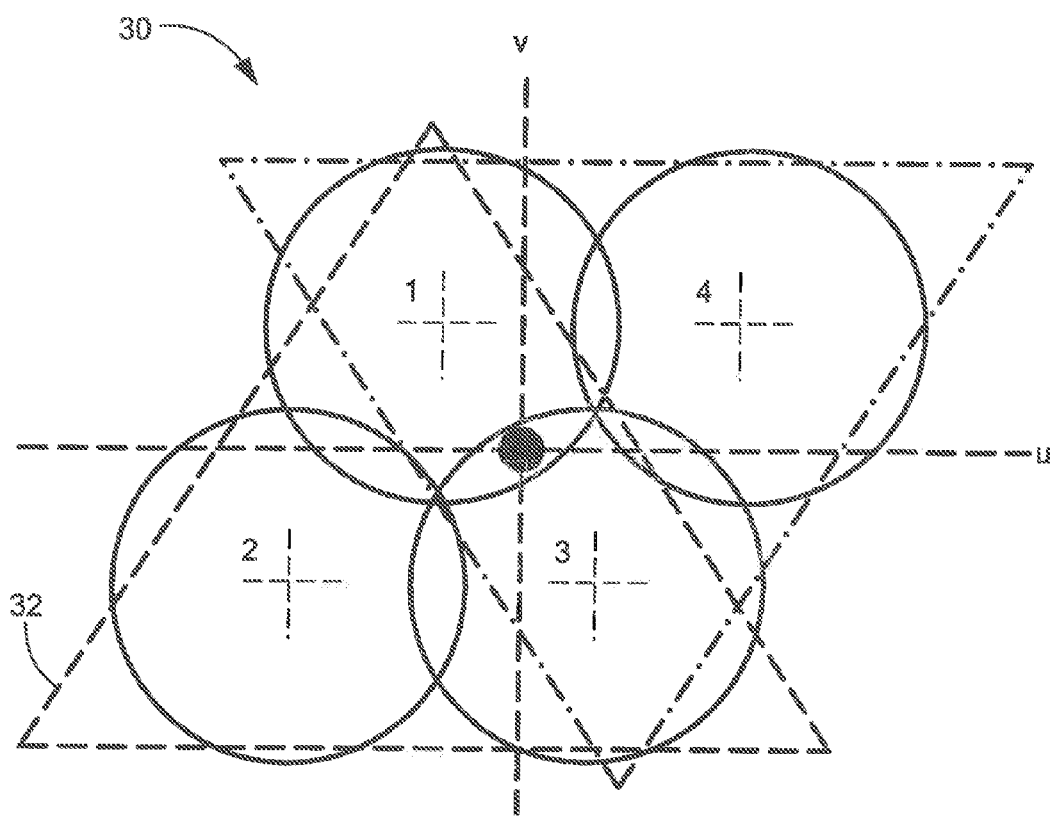
FIG. 3 is a diagram illustrating an exemplary four beam cluster that may be used in a radar system in accordance with an embodiment.

FIG. 3 is a diagram illustrating an exemplary four beam cluster 30, including four overlapping offset receive beams, that may be used in a radar system in accordance with an embodiment. As shown, the four beam cluster 30 has two upper beams (beam 1 and beam 4) and two lower beams (beam 2 and beam 3). The two upper beams are offset from the two lower beams (i.e., they are not in vertical alignment). As will be described in greater detail, a beamformer may be provided to generate the four overlapping beams of FIG. 3. However, in a system that only has three available channels, it may not be possible to concurrently process all four beams to perform ML estimation. Thus, in some embodiments, the four beams of FIG. 3 may be implemented in three beam triads. As shown in FIG. 3, a first triad 32 may include beams 1, 2, and 3 and a second triad may include beams 1, 3, and 4. During radar search operations, the three beam triads may repeat in sequence to form a search fence. During track operations, only one of the two triads may be used. An array analysis has shown that a three beam cluster is sufficient for MLE tracking, but is inefficient for search due to a 67% overlap in the receive beams. Therefore, the sequential four beam arrangement may be used during MLE searching to improve search efficiency. FIG. 7A provides an exemplary process flow of steps 210 of forming triads with four overlapping offset beams, step 220 of performing a four beam MLE search for targets, and a step 230 of three beam MLE to further track objects detected during the search.

Figure 4:
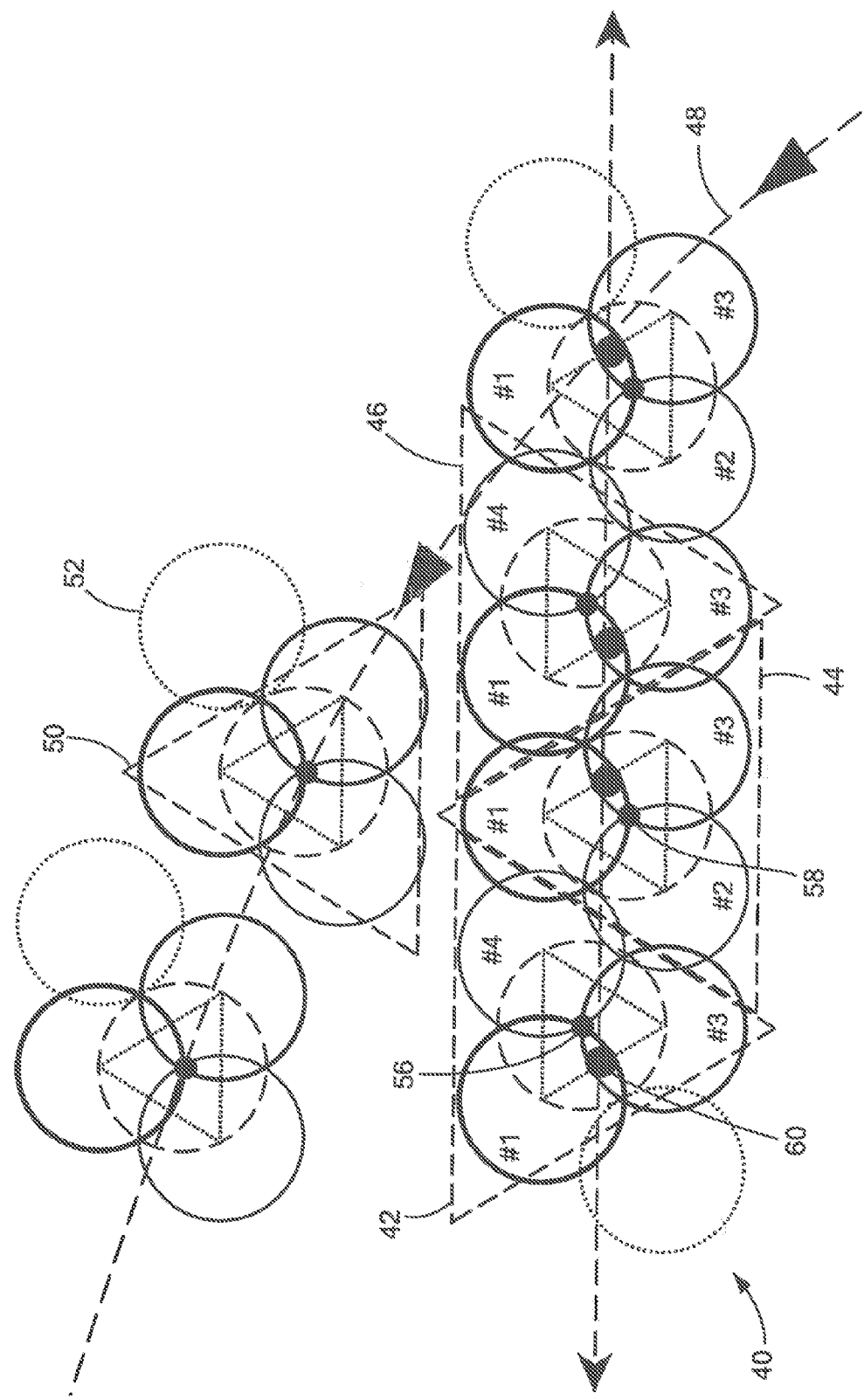
FIG. 4 is a diagram illustrating the use of the four beam cluster of FIG. 3 during search and tracking operations in accordance with an embodiment.

FIG. 4 is a diagram illustrating the use of the four beam cluster 30 of FIG. 3 during search and tracking operations in accordance with an embodiment. In a lower portion of FIG. 4, a four beam cluster is used to create a search fence 40 by sequentially forming three beam triad portions of the four beam cluster. Thus, a first triad 42 may include beams 1, 3, and 4; a second triad 44 may include beams 1, 2, and 3; a third triad 46 may include beams 1, 3, and 4; and so on. In each case, the outputs of the three receive beams, after further signal processing, may be directed to a maximum likelihood estimator for use in determining whether a target has been detected and, if so, a location of the target. When a target is detected, the search operation may transition to a track operation to track the detected target. This transition is indicated by line 48 in FIG. 4. During the track operation, a single three receive beam triad, (e.g., triad 50) may be used to track the location of the target. A fourth beam 52 may be ignored. The four beam search operation using MLE is capable of resolving azimuth and elevation angles for a detected target to aid in the transition to tracking mode.

In the arrangement of FIG. 4, during the search mode, the transmit beam may be centered on the receive cluster triad. Thus, for the first receive triad 42, the transmit beam may be steered to the center point 56 of the first triad; for the second receive triad 44, the transmit beam may be steered to the center point 58 of the second triad; and so on. Also during the search mode, the receive beam may be steered to the centroid of each corresponding four beam cluster. For example, with reference to FIG. 4, the receive beam associated with the first triad 42 may be steered to the centroid 60 of the corresponding four beam cluster, and so on. During track, both the transmit beam and the receive triad beams are centered on the target.

Figure 5:
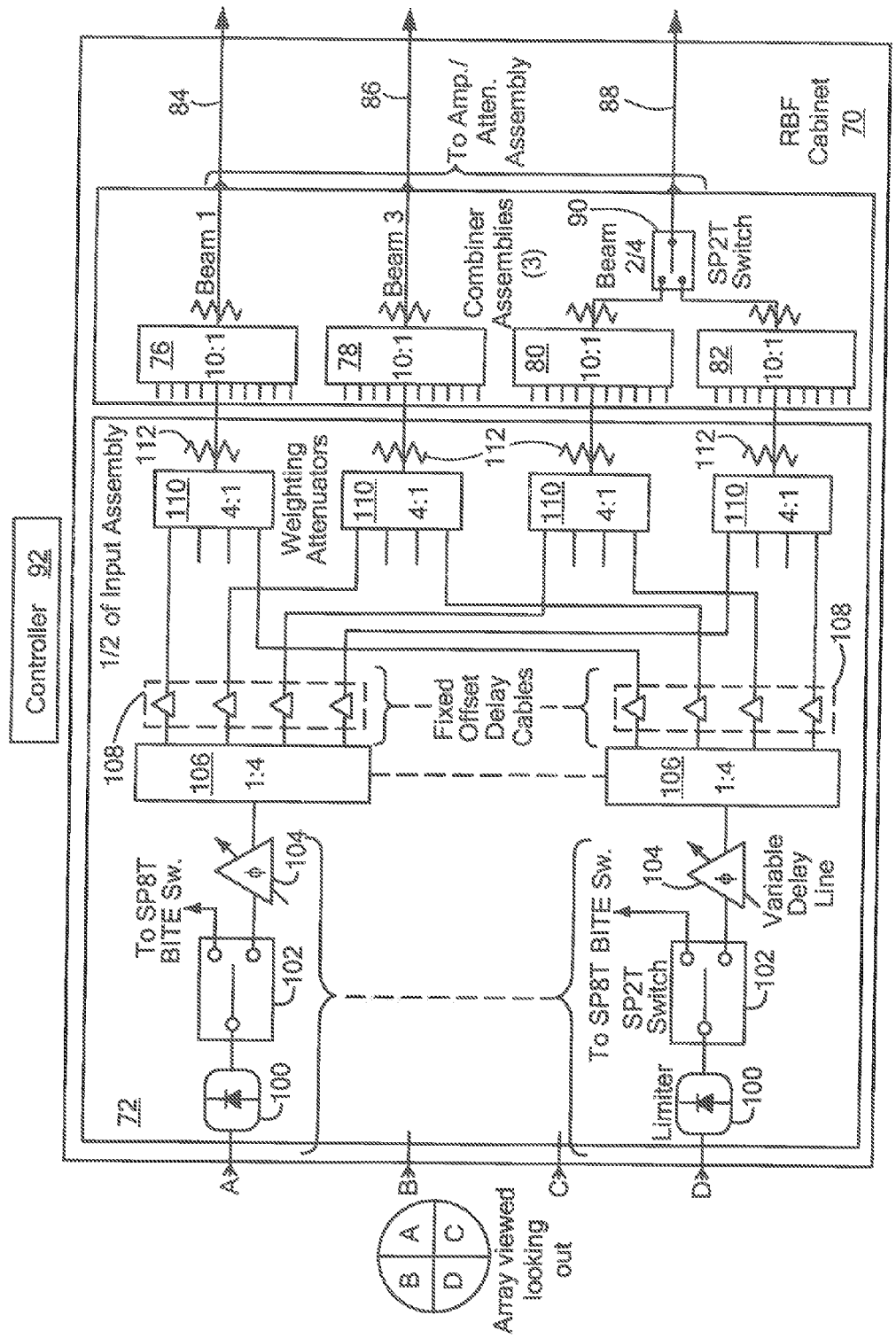
FIG. 5 is a block diagram illustrating an exemplary beamformer system in accordance with an embodiment.

FIG. 5 is a block diagram illustrating an exemplary beamformer system 70 in accordance with an embodiment. The beamformer system 70 may be used with, for example, the antenna array 20 of FIG. 2, or similar arrays, to enable the use of multi-beam MLE during search and track operations. In some embodiments, the beamformer system 70 may be added as a retrofit to an existing radar system to permit the existing system to meet one or more performance requirements. As shown, the beamformer system 70 may include first stage circuitry 72 and second stage circuitry 74. The first stage circuitry 72 forms receive beams for related subarray groups associated with the array antenna. The subarray groups may each include one subarray from each of the four quadrants (A, B, C, D) of the antenna. In FIG. 5, the circuitry 72 is shown for one subarray group. One of these circuits may be provided for each subarray group in the system. In the array antenna 20 of FIG. 2, for example, there are 40 subarrays with 10 subarrays per quadrant. Therefore, there will be ten subarray groups for this antenna and, correspondingly, ten first stage circuits 72 in the beamformer 70. As will be appreciated, the number of subarray groups may vary in different implementations.

The second stage 74 of the beamformer system 70 combines the beams associated with the various subarray groups of the first stage 72 to generate four overlapping offset beams of a four beam cluster (e.g., four beam cluster 30 of FIG. 3). As shown, the second stage 74 may include four combiners 76, 78, 80, 82 to combine the signals of the first stage. Because there are ten subarray groups in the illustrated embodiment (i.e., 40 subarrays), the combiners 76, 78, 80, 82 are 10:1 combiners. Other combining ratios may be used in other implementations and will typically depend upon the number of subarrays being used (e.g., a combining ratio of N:1, where N=K/4 and K is the number of subarrays). The outputs of the combiners 76, 78, 80, 82 represent the four overlapping receive beams of the four beam cluster. As shown in FIG. 5, although four beams are generated by the combiners 76, 78, 80, 82 of the second stage 74, the beamformer 70 includes only three beam output ports 84, 86, 88. This may the because, for example, the underlying system has a limited number of processing channels to process received signals. Because there are only three beam output ports, the second and fourth beams time share the third output port 88. A switch 90 may be provided to facilitate the time sharing of the third output port 88 by controllably coupling either the second or the fourth beam to the third beam output port 88 at desired times. Thus, during a search operation, the switch 90 may alternate between the second and fourth beams to provide the sequential four beam cluster required to form a search fence (e.g., search fence 40 of FIG. 4). During target tracking, the switch 90 may remain in one position with either the second or the fourth beam coupled to the third beam output port 88. The switch 90 may be implemented in either hardware or software.

As shown in FIG. 5, the first stage circuitry 72 may include one input for each of the four quadrants (A, B, C, D) of the corresponding array antenna. Each of these inputs may receive the combined receive signals of the elements in a corresponding subarray of the antenna (i.e., a subarray within the corresponding quadrant). For each input, the first stage circuitry 72 may include: a limiter 100, a switch 102, and a variable delay line 104. The limiters 100 are operative for limiting the magnitude of transmit leakage signals to, for example, protect the subsequent circuitry. The switches 102 may be used to bypass the beamformer network in order to perform antenna diagnostics and system performance monitoring. The variable delay lines 104 are operative for aligning each receive subarray to one another.

The outputs of the variable delay lines 104 are each coupled to a corresponding 1:4 divider 106 which divides the signal into four equal components. Fixed offset delay cables 108 are then used to provide fixed delay amounts to the fear components to provide offsets between the corresponding output beams (e.g., beam offsets such as those shown in FIG. 3). Each subarray with in a quadrant has a different delay for each of the four overlapped beams. The same set of four delays may be associated with each quadrant symmetric subarrays. The outputs of the delay cables 108 are provided to the inputs of four 4:1 combiners 110 which each output one beam for the corresponding subarray group. Weighting attenuators 112 may be provided within the first stage circuitry 72 to provide individual amplitude weighting for each of the subarray beams. As described previously, the beam outputs of a plurality of first stage circuits 72 may be combined within a second stage 74 of the beamformer 70 to generate the four overlapping receive beams of the four beam cluster.

As shown in FIG. 5, a controller 92 may the provided to control the operation of various switching components within the beamformer 70 as well as other devices, components, and subsystems within the associated radar. In some embodiments, the controller 92 may be implemented using one or more digital processing devices. The digital processing device(s) may include, for example, one or more of: a general purpose microprocessor, a digital signal processor (DSP), a reduced instruction set computer (RISC), a complex instruction set computer (CISC), an application specific integrated circuit (ASIC), a field programmable gate array (FPGA), a programmable logic array (PLA), a microcontroller, an embedded controller, a multi-core processor, a processor complex, and/or others, including combinations of the above. In various embodiments, techniques and systems described herein may be implemented using any combination of hardware, software, and firmware.

In at least one embodiment, features described herein are implemented within a large-scale early warning radar (EWR) system that includes multiple ultra-high frequency (UHF) active electronically scanned antennas. The radar may include 3 faces spaced 120 degrees from one another to achieve 360 degrees of coverage in azimuth. The radar may use an analog corporate fed array for transmit. The radar may also include a receive corporate feed and RF signal combiner structure from the antenna array to the receiver-exciter (REX). The radar may use a radio frequency monitor (RFM) to provide inline/transmit receive alignment in some embodiments. The radar may also include signal processing circuitry for implementing one or more MLE processing functions. It should be appreciated that the above system description is exemplary of one radar system that may incorporate features described herein. Many other system architectures may alternatively be used.

Figure 6:
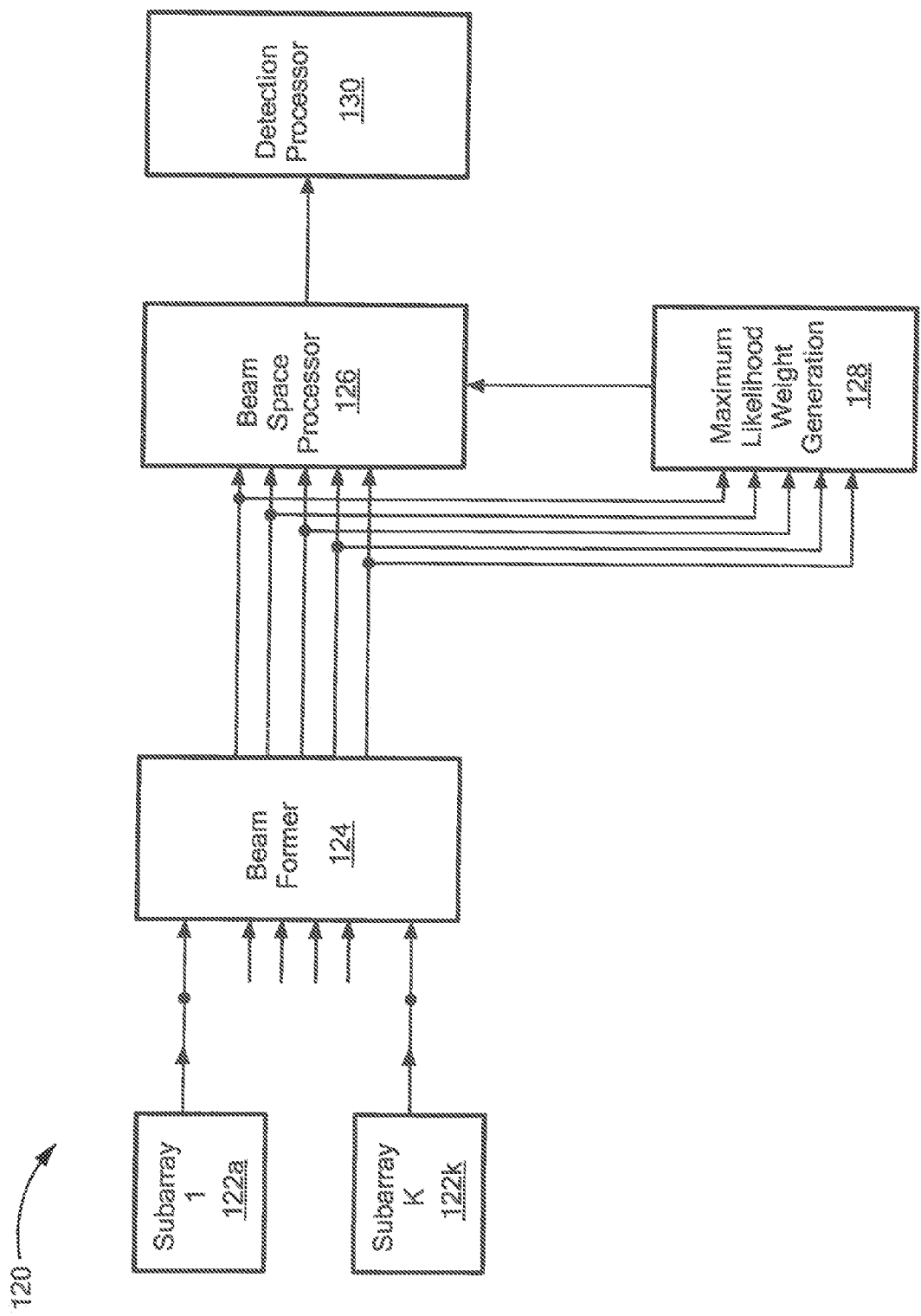
FIG. 6 is a block diagram illustrating a processing arrangement that may be used to perform MLE processing in a radar system in accordance with an embodiment.

FIG. 6 is a block diagram illustrating a processing arrangement 120 that may be used to perform MLE processing in a radar system in accordance with an embodiment. The processing arrangement 120 may be used to perform both MLE search and MLE tracking operations. As illustrated, the processing arrangement 120 includes: a plurality of subarrays 122a-122k associated with an AESA, a beamformer 124, a beam space processor 126, a maximum likelihood (ML) weight generator 128, and a detection processor 130. The beamformer 124 receives signals from the various subarrays 122a-122k and forms a number of beams for the AESA by combining the received signals in a predetermined manner. In some embodiments, the analog beamformer system 70 of FIG. 5 may be used as the beamformer 124. The beam space processor 126 processes the various beams output by the beam former 124 and applies maximum likelihood estimation to the beams to generate a single beam at an output thereof. The ML weight generator 128 also receives the beams output by the beam former 124 and uses the beam information to generate ML weights for use by the beam space processor 126. Techniques for performing maximum likelihood estimation in radar systems are generally well known in the art (see, e.g., U.S. Pat. No. 7,969,345 to Abatzoglou et al., which is hereby incorporated by reference herein in its entirety). The detection processor 130 processes the output signal of the beam space processor 126 to generate information about targets therein.

In various embodiments, the beam space processor 126, the ML weight generator 128, and the detection processor 130 may be implemented using one or more digital processing devices. The digital processing devices may include, for example, a general purpose microprocessor, a digital signal processor (DSP), a reduced instruction set compute (RISC), a complex instruction set compute (CISC), an application specific integrated circuit (ASIC), a field programmable gate array (FPGA), a programmable logic array (PLA), a microcontroller, an embedded controller, and/or others, including combinations of the above. In various embodiments, techniques and systems described herein may be be implemented using any combination of hardware, software, and firmware.

Elements of different embodiments described herein may be combined, to form other embodiments not specifically set forth above. Various elements, which are described in the context of a single embodiment, may also be provided separately or in any suitable sub-combination. Other embodiments not specifically described herein are also within the scope of the following claims.

Having described exemplary embodiments of the invention, it will now become apparent to one of ordinary skill in the art that other embodiments incorporating their concepts may also be used. The embodiments contained herein should not be limited to disclosed embodiments but rather should be limited only by the spirit and scope of the appended claims. All publications and references cited herein are expressly incorporated herein by reference in their entirety.

What is claimed is:

1. A radar system comprising:
   an array antenna having a plurality of subarrays;
   an analog beamformer to generate first, second, third, and fourth offset receive beams that are arranged as two triads for the array antenna, each of the triads formed by three simultaneously formed receive beams of the four offset receive beams, the beamformer comprising: first, second, and third beam output ports, wherein the first receive beam is coupled to the first beam output port and the third receive beam is coupled to the second beam output port; and
   a switch to allow the second and fourth receive beams to time share the third beam output port.

2. The radar system of claim 1, further comprising:
   a maximum likelihood estimator coupled to acquire receive signal information associated with the first, second, and third beam output ports, the maximum likelihood estimator to estimate a location of a target, if any, based on the receive signal information, wherein the maximum likelihood estimator is used to determine target location during both search and track operations.

3. The radar system of claim 1 further comprising:
   a controller to control operation of the radar system, wherein the controller is configured to generate a sequential four beam receive cluster via time multiplexed beams to form a search fence to perform maximum likelihood searching for the radar system.

4. The radar system of claim 3 wherein:
   the controller is configured to generate a three receive beam triad to perform maximum likelihood tracking for a detected target, wherein the three beam triad includes three of the offset receive beams generated by the beamformer.

5. The radar system of claim 4 wherein:
   the controller is configured to generate a transmit beam directed toward a centroid of the sequential four beam receive cluster during maximum likelihood searching.

6. The radar system of claim 5 wherein:
   the controller is configured to generate a transmit beam directed toward the target being tracked during maximum likelihood tracking.

7. The radar system of claim 1 wherein:
   the array antenna is divided into four quadrants and the plurality of subarrays are divided symmetrically amongst the four quadrants; and
   the beamformer includes:
      a first stage having a plurality of subarray beamformers to form beams for subarray groups of the array antenna, each subarray group including one subarray from each of the four quadrants of the array antenna; and
      a second stage to combine outputs of the subarray beamformers to form the first, second, third, and fourth offset receive beams, wherein the first, second, and third beam output ports and the switch are part of the second stage.

8. The radar system of claim 7 wherein:
   the plurality of subarray beamformers include fixed offset delay cables to generate the offsets between the first, second, third, and fourth offset receive beams.

9. The radar system of claim 7 wherein:
   the beamformer is configured to utilize a subarray originally configured and arranged for a monopulse based radar.

10. A method for use in a radar system having an AESA antenna, the method comprising:
    forming four analog offset receive beams arranged in two triads for the AESA antenna, each of the triads formed by three simultaneously formed receive beams of the four analog offset receive beams;
    performing four beam maximum likelihood estimation (MLE) searching using the four offset receive beams in a four beam sequential cluster to search for targets; and
    performing three beam MLE tracking to track a target detected during four beam MLE searching using three of the four offset receive beams.

11. The method of claim 10, wherein:
    the four beam sequential cluster is generated by time multiplexing beams at one or more beamformer output ports.

12. The method of claim 10, wherein:
    performing four beam MLE searching includes generating a search fence by repeating the four beam sequential cluster.

13. The method of claim 10, wherein:
    performing four beam MLE searching includes transmitting a signal toward a centroid of the four beam sequential cluster.

14. A radar system comprising:
    an AESA antenna;
    a beamformer to generate multiple offset receive beams for the AESA antenna; and
    a controller to provide control functions for the radar system, wherein the controller is configured to perform multi-beam maximum likelihood (ML) searching for the radar system to search for targets in a coverage region of interest and to perform multi-beam ML tracking for the radar system to track one or more detected targets in the coverage region;

wherein the controller is configured to generate a sequential four beam receive cluster of two or more simultaneously formed beams via time multiplexed beams to form a search fence to perform the multi-beam ML searching for the radar system.

15. The radar system of claim 14, wherein:
the controller is configured to generate a transmit beam directed toward a centroid of the sequential four beam receive cluster during ML searching.

16. The radar system of claim 14, wherein:
the controller is configured to generate a three receive beam triad to perform multi-beam ML tracking for the radar system.

17. The radar system of claim 1 wherein the array antenna is configured in an inline transmit/receive (T/R) alignment.

18. The radar system of claim 17 wherein the antenna array is spaced and configured with three faces to provide 360 degrees of coverage in azimuth.

19. The radar system of claim 17 wherein the antenna array comprises at least one main beam and one or more sidelobes, the one or more sidelobes configured to be operated at below a predetermined level of gain below a gain of the at least one main beam.

* * * * *